United States Patent
Kacker et al.

(10) Patent No.: US 11,945,155 B2
(45) Date of Patent: Apr. 2, 2024

(54) TECHNIQUES FOR REDUCING PEEL FORCES IN ADDITIVE FABRICATION AND RELATED SYSTEMS AND METHODS

(71) Applicant: Formlabs, Inc., Somerville, MA (US)

(72) Inventors: Aruni Kacker, Somerville, MA (US); Andrew DeGonge, Cambridge, MA (US); Garth Whelan, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 137 days.

(21) Appl. No.: 17/479,271

(22) Filed: Sep. 20, 2021

(65) Prior Publication Data
US 2022/0088852 A1    Mar. 24, 2022

Related U.S. Application Data

(60) Provisional application No. 63/135,003, filed on Jan. 8, 2021, provisional application No. 63/081,046, filed on Sep. 21, 2020.

(51) Int. Cl.
*B33Y 50/02* (2015.01)
*B29C 64/124* (2017.01)
(Continued)

(52) U.S. Cl.
CPC .......... *B29C 64/124* (2017.08); *B29C 64/393* (2017.08); *B33Y 10/00* (2014.12); *B33Y 50/02* (2014.12); *B29C 64/282* (2017.08)

(58) Field of Classification Search
CPC ....................................................... B33Y 50/02
See application file for complete search history.

(56) References Cited

U.S. PATENT DOCUMENTS 5,015,424 A    5/1991 Smalley
5,135,379 A    8/1992 Fudim
(Continued)

FOREIGN PATENT DOCUMENTS

CN    104136200 A    11/2014
CN    104608378 A    5/2015
(Continued)

OTHER PUBLICATIONS

International Search Report and Written Opinion for International Application No. PCT/US2017/53376 dated Dec. 11, 2017.
(Continued)

*Primary Examiner* — Suresh Suryawanshi
(74) *Attorney, Agent, or Firm* — Wolf, Greenfield & Sacks, P.C.

(57) ABSTRACT

In additive fabrication, less stiff layers generally require a comparatively higher peel force during separation, and that therefore geometric structures that include less stiff layers will also require a comparatively higher peel force during separation. Techniques to lower or otherwise mitigate undesirably large peel forces are described. These techniques include modification to how layers susceptible to a large peel force are formed, modification to a model of a part prior to generating instructions for an additive fabrication device to fabricate the part, and/or improvements to an additive fabrication device hardware.

16 Claims, 14 Drawing Sheets

(51) Int. Cl.
    *B29C 64/393*      (2017.01)
    *B33Y 10/00*      (2015.01)
    *B29C 64/282*      (2017.01)

(56) References Cited

U.S. PATENT DOCUMENTS

| | | |
|---|---|---|
| 5,609,814 A | 3/1997 | Takano |
| 5,965,079 A | 10/1999 | Manners |
| 7,833,000 B2 | 11/2010 | Kihara et al. |
| 11,161,296 B2 | 11/2021 | FrantzDale et al. |
| 2005/0145177 A1 | 7/2005 | McSwiney et al. |
| 2008/0021586 A1 | 1/2008 | Schillen et al. |
| 2011/0107967 A1 | 5/2011 | Hopkinson et al. |
| 2012/0046125 A1 | 2/2012 | Sullivan et al. |
| 2015/0130114 A1 | 5/2015 | Joyce |
| 2015/0145177 A1 | 5/2015 | El-Siblani et al. |
| 2015/0183168 A1 | 7/2015 | Liverman et al. |
| 2016/0016361 A1* | 1/2016 | Lobovsky .............. B33Y 10/00 425/165 |
| 2016/0046080 A1* | 2/2016 | Thomas ................ B29C 64/379 425/165 |
| 2016/0052205 A1* | 2/2016 | FrantzDale ........... B29C 64/255 264/401 |
| 2016/0067922 A1 | 3/2016 | Voris et al. |
| 2016/0082666 A1 | 3/2016 | de Pena et al. |
| 2016/0297141 A1 | 10/2016 | El-Siblani et al. |
| 2018/0015664 A1 | 1/2018 | Kabalnov et al. |
| 2018/0085994 A1 | 3/2018 | FrantzDale et al. |
| 2019/0369566 A1* | 12/2019 | Lobovsky ............. B29C 64/124 |
| 2021/0078251 A1* | 3/2021 | Damiano ............. B29C 64/255 |

FOREIGN PATENT DOCUMENTS

| | | |
|---|---|---|
| EP | 0 609 772 A1 | 8/1994 |
| JP | H10-180882 A | 7/1998 |
| JP | 2004-009574 A | 1/2004 |
| WO | WO-2019232303 A1 * | 12/2019 ........... B29C 64/124 |

OTHER PUBLICATIONS

Extended European Search Report in connection with European Application No. 17854108.2 dated Apr. 1, 2020.
International Preliminary Report on Patentability for International Application No. PCT/US2017/053376, dated Apr. 4, 2019.

* cited by examiner

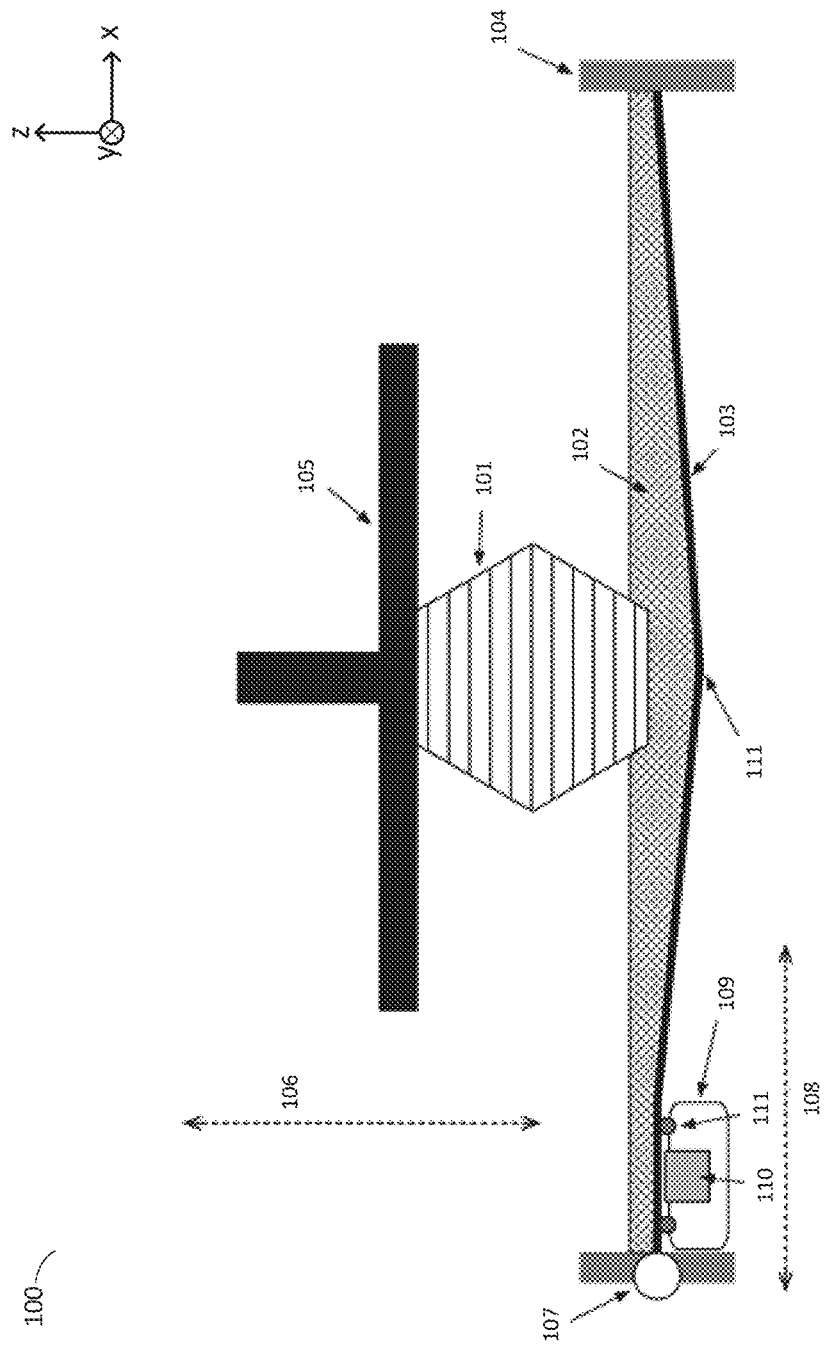

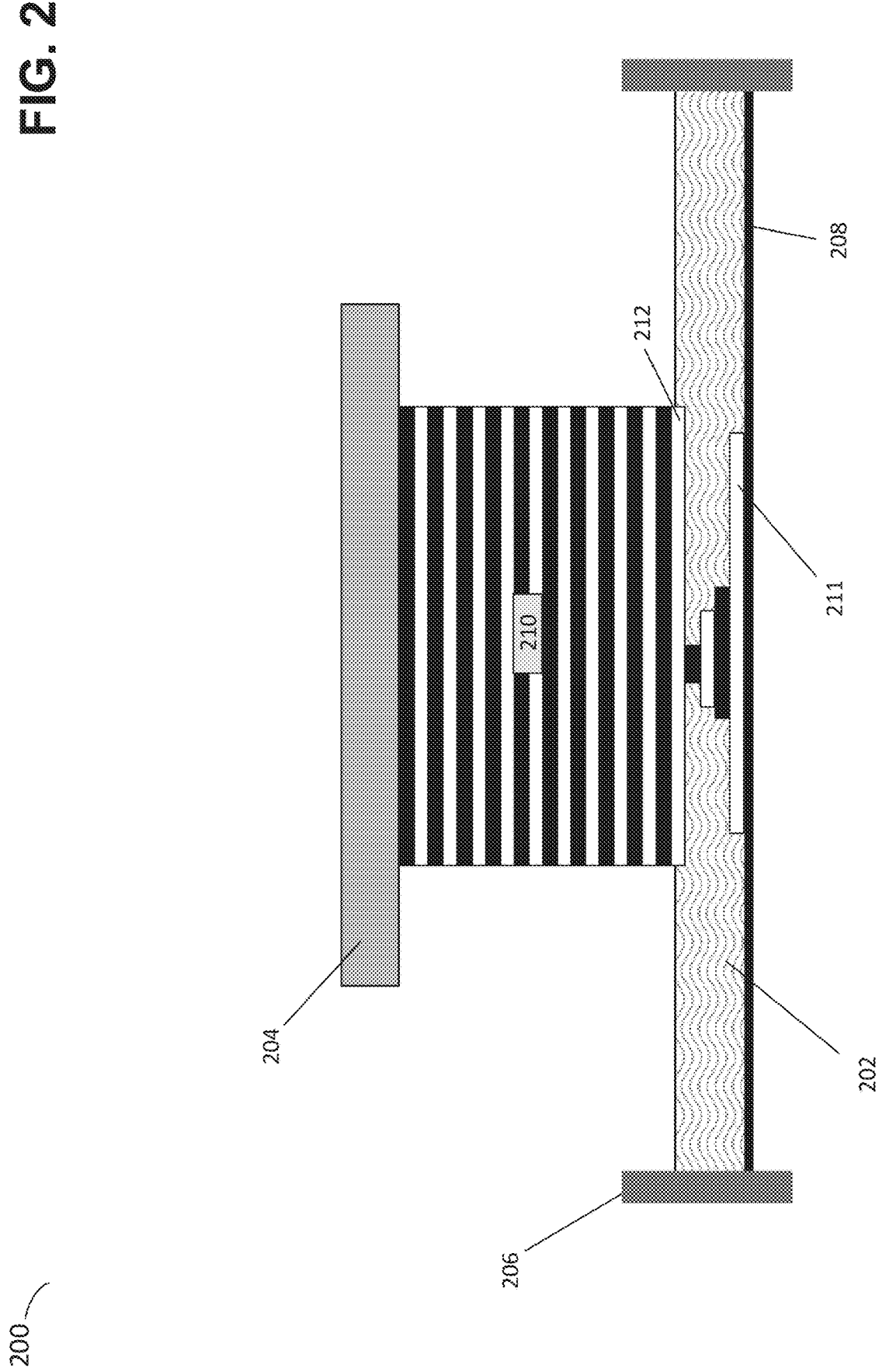

TECHNIQUES FOR REDUCING PEEL FORCES IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/081,046, filed Sep. 21, 2020, titled "Techniques for Reducing Peel Forces in Additive Fabrication and Related Systems and Methods," and U.S. Provisional Patent Application No. 63/135,003, filed Jan. 8, 2021, titled "Techniques for Reducing Peel Forces in Additive Fabrication and Related Systems and Methods," each of which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the object is formed by moving an area of incident actinic radiation across the layer of liquid resin to complete the cross section of the object being formed. An area of incident actinic radiation could be caused by any light source(s), such as by a laser.

SUMMARY

According to some aspects, a method is provided of configuring an additive fabrication device to fabricate an object, the additive fabrication device configured to form the object from a plurality of layers of solid material by directing at least one source of actinic radiation onto a liquid photopolymer, the method comprising generating, using at least one processor, instructions that, when executed by the additive fabrication device, cause the additive fabrication device to fabricate the object at least in part by forming a first layer of the object according to a three-dimensional model of the object, wherein a first region of the first layer is cured by the at least one source of actinic radiation at a first exposure power, and wherein a second region of the first layer is cured by the at least one source of actinic radiation at a second exposure power, and forming a second layer of the object in contact with the first layer of the object, wherein at least a third region of the second layer overlaps a portion of the first region of the first layer, and wherein the third region of the second layer is cured with a greater cure depth than an adjacent region of the second layer, thereby directing additional actinic radiation to the portion of the first region of the first layer through the third region of the second layer.

According to some aspects, a computer system is provided comprising at least one processor, at least one computer readable medium comprising processor-executable instructions that, when executed, cause the at least one processor to perform a method of configuring an additive fabrication device to form an object from a plurality of layers of solid material by directing at least one source of actinic radiation onto a liquid photopolymer, the method comprising generating, using at least one processor, instructions that, when executed by the additive fabrication device, cause the additive fabrication device to fabricate the object at least in part by forming a first layer of the object according to a three-dimensional model of the object, wherein a first region of the first layer is cured by the at least one source of actinic radiation at a first exposure power, and wherein a second region of the first layer is cured by the at least one source of actinic radiation at a second exposure power, and forming a second layer of the object in contact with the first layer of the object, wherein at least a third region of the second layer overlaps a portion of the first region of the first layer, and wherein the third region of the second layer is cured with a greater cure depth than an adjacent region of the second layer, thereby directing additional actinic radiation to the portion of the first region of the first layer through the third region of the second layer.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1D illustrate a schematic view of a stereolithographic device that forms a plurality of layers of a part, according to some embodiments;

FIG. 2 depicts an example of an additive fabrication device forming a part comprising an expanding area, according to some embodiments;

DETAILED DESCRIPTION

Figure 1B:
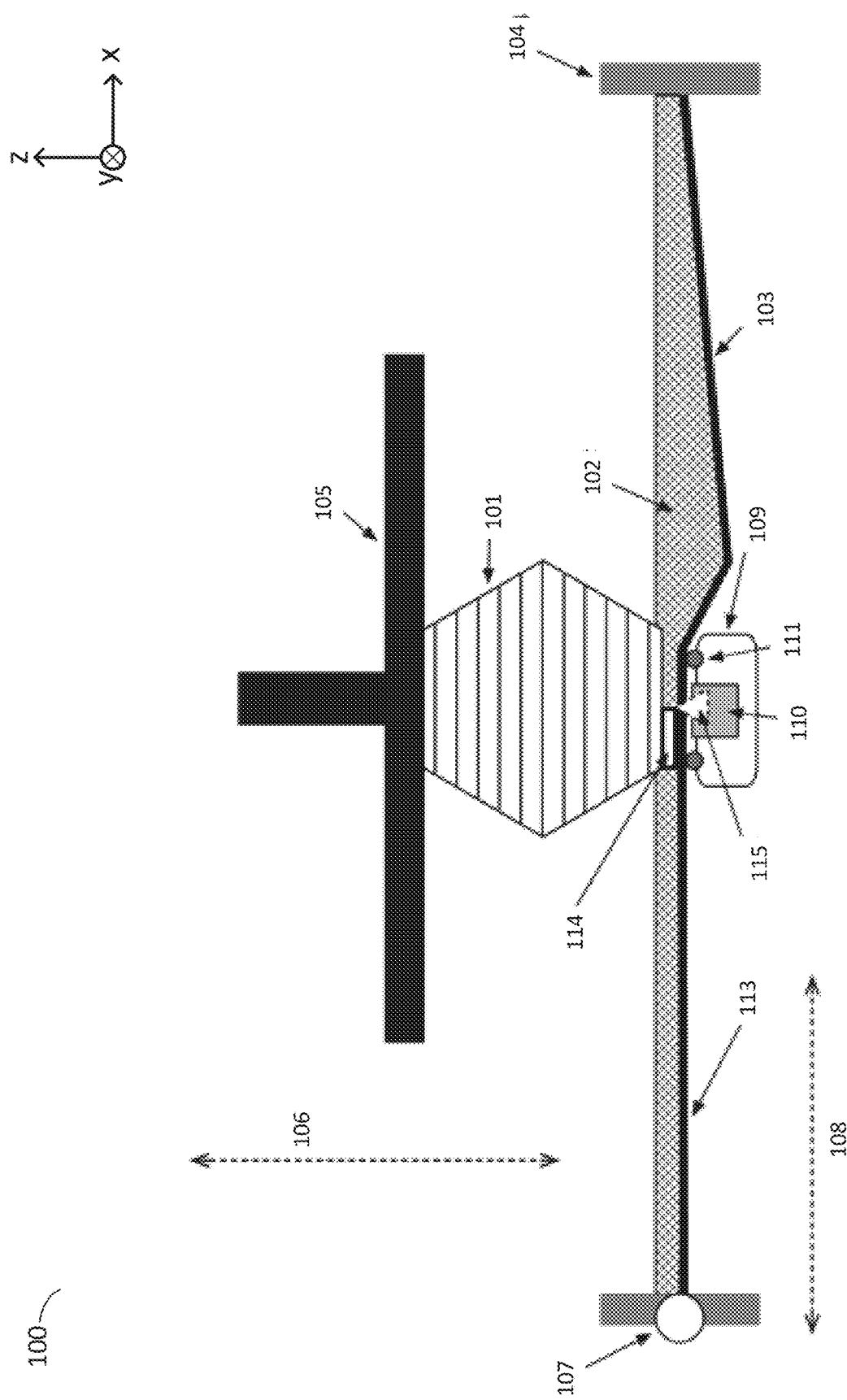

As discussed above, in additive fabrication a plurality of layers of material may be formed on a build platform. In some cases, one or more of the layers may be formed so as to be in contact with a surface other than another layer or the build platform. For example, stereolithographic techniques may form a layer of resin so as to be in contact with an additional surface such as a container in which the liquid resin is located. In order to form additional layers of the part, any bonding that occurs between the floor of the container and the layer must be broken.

Techniques for reducing the strength of the bond between a part and a surface may include inhibiting the curing process or providing a highly smooth surface on the inside of a container. In many use cases, however, at least some force must be applied to remove a cured resin layer from the container. Multiple problems may arise, however, due to the application of force during the above-described processes. In some use cases, the separation process may apply a force to and/or through the part itself. A force applied to the part may, in some cases, cause deformation or mechanical failure of the part itself. In some cases, other elements of the additive fabrication, such as a film or layer of the container, may be damaged.

In some cases, a stereolithographic device may comprise a container that includes a thin film as an interior surface. In such cases, the use of a film may lower the forces needed to separate the part from the container. As a result, the above-described issues with parts becoming deformed may be mitigated.

The inventors have recognized and appreciated that particular geometrical shapes that may be formed during fabrication of a part can result in layers much more likely to adhere strongly to the container. Separation of such a layer from the container may result in deformation to the part. Moreover, in the case of a container that includes a film as described above, the adhesion of such layers may be sufficiently large that even with the increased ability to peel the film from the layer afforded by a film, the layer may nonetheless be deformed. In some cases, the film may even be torn or otherwise damaged as a result of the forces necessary to separate the layer from the container.

According to some embodiments, the geometrical shapes that may cause particularly high separation forces include any shapes that have a cross-sectional area that is greater in an later-formed portion of the part compared with an earlier-formed portion of the part. Examples of such shapes include "T" shapes and a cone oriented on its tip. In each case, as the part is formed layerwise, a layer is formed that has a high surface area (which produces a greater total adhesion force than a lower surface area layer), while the layer and preceding layers may not provide much of a counteracting force to resist adhesion of the layer to the container while it is removed. In this manner, such a layer may act like a 'suction cup' and may require a much higher force to be separated from the container than a typical layer.

To illustrate these issues further, an illustrative stereolithographic device and stages of its operation are depicted in FIGS. 1A-1D, according to some embodiments. As shown in the example of FIGS. 1A-1D, stereolithographic device 100 includes a build platform 105 that is configured to adjust its position towards and away from container 104 along an axis 106, referred to herein as the Z axis. The build platform 105 may support a part 101 being formed by the stereolithographic process.

In the example of FIGS. 1A-1D, the container 104 may contain a volume of photopolymer resin 102 and comprise a bottom surface formed by a thin, flexible and/or elastic film 103, substantially transparent to actinic radiation 115. The film 103 may be held under tension by a tensioning device 107. An optics module 109 may be moved along axis 108, referred to herein as the X axis, such that roller elements 111 are in contact with the lower surface of the film 103. The optics module 109 comprises an exposure source 110 of actinic radiation 115 which selectively emits actinic radiation along its length (i.e., the axis running orthogonally to both axis 106 and 108, referred to herein as the Y axis). The optics module 109 further comprises roller elements 111 which are mounted to the top side of the optics module 109 opposing the bottom of the film 103.

In some embodiments, the film 103 may comprise any highly flexible and/or non-reactive material, such as Teflon® (or other fluoropolymer or polytetrafluoroethylene-based material, such as fluorinated ethylene propylene). The sides of the container 104 may be comprised of a more rigid material, such as an acrylic plastic, or may alternatively may be formed of a flexible or compliant material.

According to some embodiments, the stereolithographic device 100 may be operated to fabricate an object, or part, 101 by selectively solidifying layers of photopolymer resin 102 onto build platform 105 by exposing the photopolymer resin 102 to a source 110 of actinic radiation 115. In particular, as shown in FIG. 1A, the build platform 105 may be moved along axis 106 to place the bottom of the build platform 105 or most recently formed layer of the part 101 in close proximity to the bottom plane of the container 104 and the film 103. As the bottom film 103 typically has a certain degree of flexibility and/or elasticity, the weight of the photopolymer resin 102 and/or downwards pressure from the motion of the build platform 106 and part 101 may cause the film 103 to form a "sag" 112, or other form of depression.

Figure 1C:
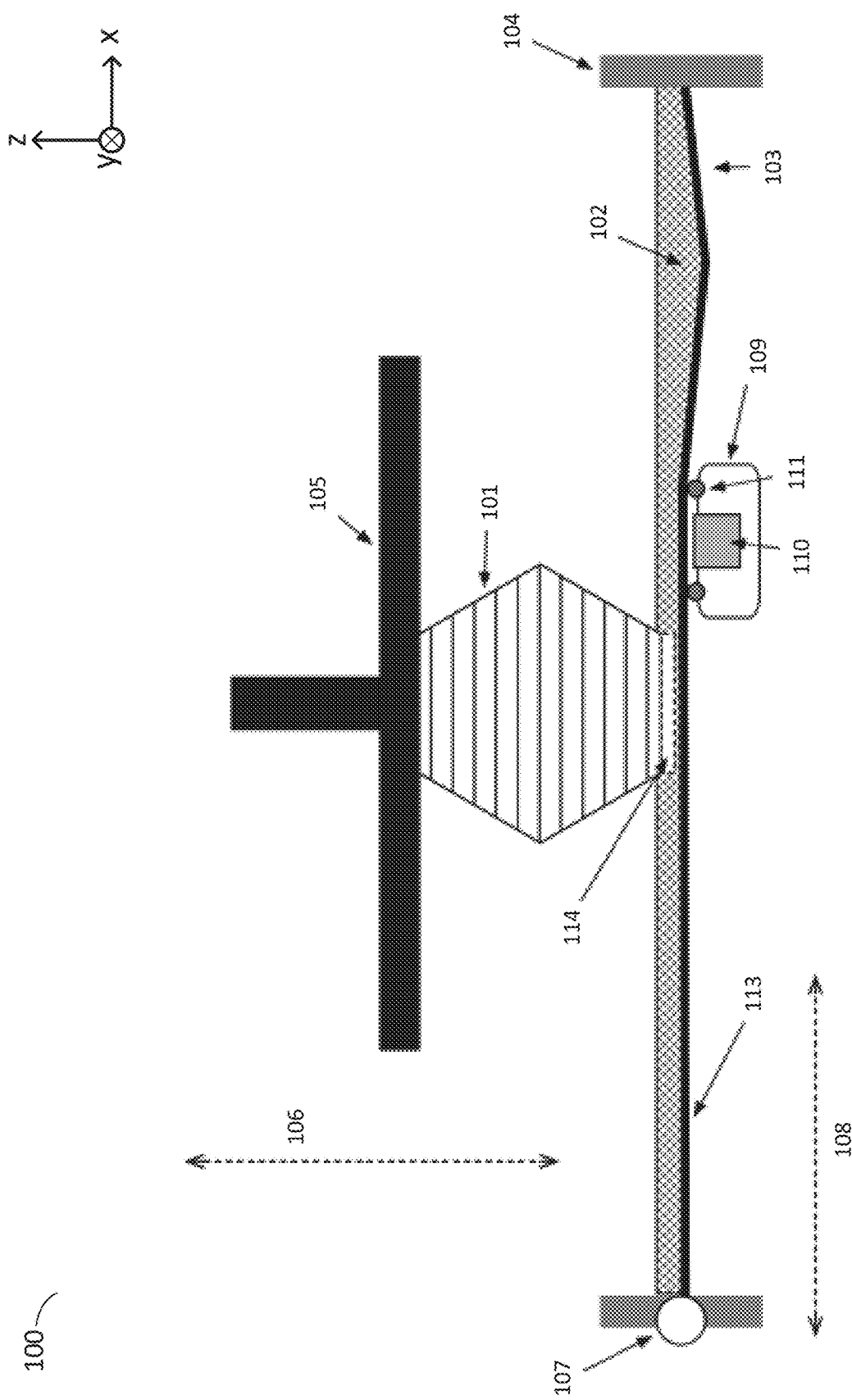

In the example of FIG. 1B, optics module 109 has been moved along the bottom plane of the container 104 through axis 108. During this motion, roller elements 111 may press upwards against film 103 in order to flatten any deflection in the film and ensure that the film forms a substantially flat plane between the roller elements in contact with the film. Also during the motion, an exposure source 110 may be activated in order to cause actinic radiation 115 to be selectively emitted at various points along the Y axis. Actinic radiation 115 emitted by the exposure source 110 may be transmitted through the film 103 and irradiate a layer of photopolymer resin 102 located between the film and the lower surface of the part 101. When exposed to the actinic radiation 115, the exposed portion of the photopolymer resin 102 may undergo various reactions, such as polymerization, causing the flowable resin 102 to solidify or otherwise adhere to the previously formed layer of the part 101, forming a new layer 114 of the part 101. As shown in the example of FIG. 1C, the optics module 109 may continue to move along the X axis while selectively exposing regions along the Y axis using the exposure source 110. Accordingly, any desired region within the X-Y plane of the bottom of the container 104 may be selectively exposed to actinic radiation, causing polymerization of a new layer 114 of the part 101 in the desired shape.

Following exposure, the newly formed layer 114 may be in contact with both a previously formed layer and the film 103. While adhesion is desirable between the newly formed layer 114 and the prior layers of the part 101, unwanted adhesion may also be formed between the newly formed layer 114 and the film 103. As discussed above, an additional step is typically required to break such adhesive forces before the formation of a new layer, in a process referred to herein as "separation."

"Separation" of a part from a surface, as used herein, refers to the removal of adhesive forces between the part and the surface (i.e. the surface of a container, the surface of a supporting liquid, etc.). It may therefore be appreciated that, as used herein, a part and a surface may be separated via the techniques described herein, though immediately subsequent to the separation may still be in contact with one another (e.g., at an edge and/or corner) so long as they are no longer adhered to one another. For instance, relative motion between a newly formed layer of material and the surface of a container may overcome chemical and mechanical adhesive forces between the liquid photopolymer and the cured photopolymer, yet the layer may still be in physical contact with the container once the adhesion has been overcome. Moreover, adhesive forces between the part and the surface may include mechanical forces (e.g., the absence of liquid between the part and surface inhibiting separation) and/or chemical adhesive forces.

Figure 1D:
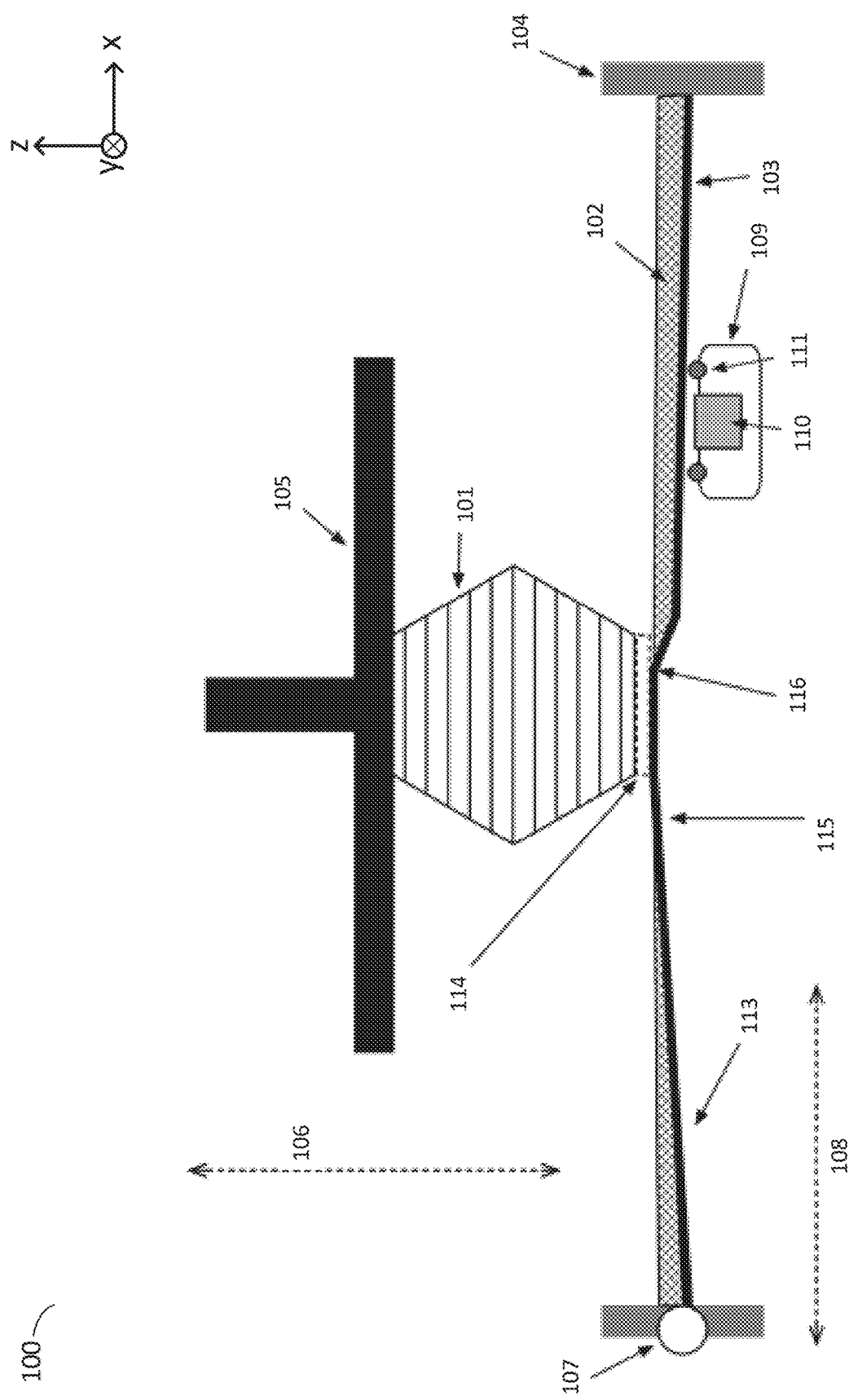

As shown in the example of FIG. 1D, one way of performing separation in illustrative stereolithographic device 100 is to lift the part 101, and thus newly formed layer 114, along axis 106, away from the film 103. Adhesive forces between the newly formed layer 114 and the film 103 may cause the film to deflect upwards 115 as the build platform 105 is moved away. Using a flexible, thin film as at least part of the floor of the container may allow a peeling edge to propagate inward from most or all of the outer edge of the contact area between the part 101 and the film 103. In particular, at a critical level of deflection, at least one portion of the film 103 may begin to separate, or peel, away from the newly formed layer 114, thus forming a peeling edge 116 which propagates across the interfacing surface of the film 103 and newly former layer 114. Separation of this manner may apply considerably less force to the part 101 compared with separation of a part from a rigid container having a release coating, as discussed above.

Following separation pictured in FIG. 1D, a new layer of the part 101 may be formed by returning to the configuration shown in FIG. 1A. In some embodiments, this may comprise returning the optics module 109 to its original position (as in FIG. 1A) without forming additional solid material. In other embodiments, however, the direction of the optics module 109 along axis 108 may be reversed, such that the formation process depicted in FIGS. 1A-1D occurs with the optics module 109 moving in the opposite direction.

In order to fabricate parts accurately, the exposure source 110 of optics module 109 must be calibrated so that it directs light to desired locations within the build area of the device 100 (that is, the area of the container in the X-Y plane in which solid material may be formed). In the case of the exposure source 110 comprising a laser and a mirror galvanometer, for example, calibration may comprise a relationship between galvanometer angle and build area position, which may differ across the build area.

As described above, the inventors have recognized and appreciated that particular geometrical shapes that may be formed during fabrication of a part can result in layers much more likely to adhere strongly to the container. FIG. 2 depicts an example of such a shape in the context of a stereolithographic device similar to device 100 shown in FIGS. 1A-1D.

In the example of FIG. 2, stereolithographic device 200 includes a build platform 204, and a container 206 that includes a film 208 and holds a liquid photopolymer 202. As shown in FIG. 2, a part 210 is in the process of being formed on the build platform 204, and includes a number of layers including layers 211 and 212; layer 211 is the most recently formed layer, and has been formed in contact with the film 208 of the container.

To separate a layer from the build platform, some relative motion of the build platform and the container is produced by operating one or more actuators to move the build platform and/or move the container. During this process, the film 208 may deform until the adhesive forces are overcome and the layer separates from the film. The amount of force necessary to overcome the adhesive forces and initiate a peel of the film away from the layer is sometimes referred to as the "peel force."

The inventors have recognized and appreciated that less stiff layers generally require a comparatively higher peel force during separation, and that therefore geometric structures that include less stiff layers will also require a comparatively higher peel force during separation. An extreme example of this would be a large layer being formed over a number of much smaller layers, such as would be expected when forming a "T"-shape. The newly formed layer lacks stiffness because it is much larger than the previously formed layer, and as such the peel force is much higher than a layer that is the same size and in the same position as the previously formed layer.

This problem is depicted in FIG. 2, in that layer 211 is much larger than the layer immediately preceding it, and as such lacks stiffness. Moving the build platform away from the container 206 may, for instance, cause the layer 211 to deform rather than peel away from the film 208. In contrast the layer 212, which was formed earlier in the process, is supported by a number of identical layers above it, and thereby had a much higher stiffness than layer 211 when it was the most recently formed layer and had to be separated from the film 208. The peel force for layer 212 from the film 208 would therefore be expected to be much lower than the peel force for layer 211.

The inventors have recognized and appreciated techniques to mitigate the above-described challenges of geometries that lead to undesirably large peel forces (hereinafter, such a geometry is referred to as an "expanding area"). Broadly speaking, these techniques include modification to how layers susceptible to a large peel force are formed, modification to a model of a part prior to generating instructions for an additive fabrication device to fabricate the part, and/or improvements to an additive fabrication device hardware. Examples of each of these approaches are discussed further below.

While the techniques discussed below relate primarily to expanding area geometries, it will be appreciated that the techniques may also be applied to large bulky parts without an expanding area. For instance, a part formed from numerous layers having a large surface area may still require a large peel force to be separated from the container, even though such a part doesn't include an expanding area. Similarly, parts formed from layers with a smaller surface area but that include hollow internal areas, such as would be formed to fabricate a cup shape, may require a large peel force by acting like a suction cup.

It will be appreciated that while the techniques described herein are generally described with respect to a stereolithographic device that includes a container having a film, the techniques are not necessarily limited to use with that type of stereolithographic device (e.g., the device shown in FIGS. 1A-1D), and in particular, are not limited to a flexible container as shown and described. For example, at least some of the techniques described below may also be applied with a rigid container, including a rigid container with a deformable upper layer (e.g., a layer of PDMS arranged over a rigid container).

Figure 3:
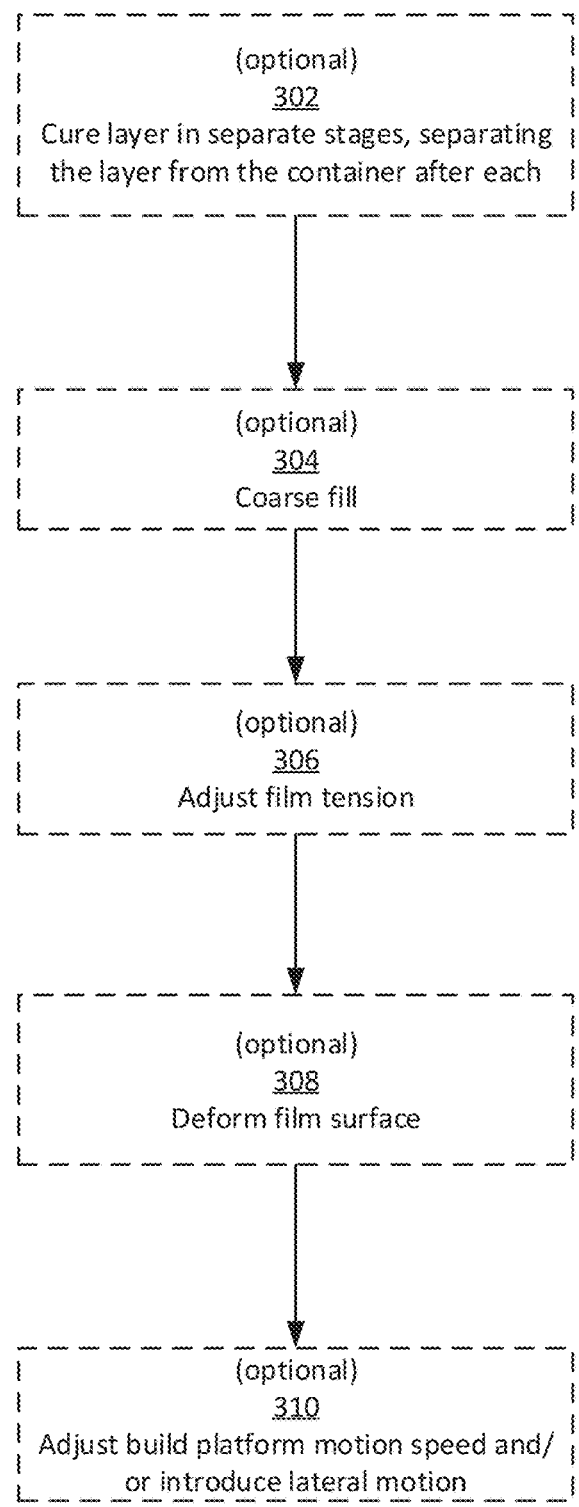
FIG. 3 is a flowchart of a method of fabricating a part comprising at least one expanding area, according to some embodiments.

FIG. 3 is a flowchart of a method of fabricating a part comprising at least one expanding area, according to some embodiments. Method 300 may be performed by a suitable additive fabrication device, including but not limited to the illustrative stereolithographic device shown in FIGS. 1A-1D. Method 300 includes optional acts 302, 304, 306, 308, and 310, each of which is an operation that may be performed one or more times by the additive fabrication device during fabrication of the part. The ordering of these acts in FIG. 3 is provided as an example and should not be viewed as limiting. In some embodiments, a computing device may generate instructions so that, when the instructions are executed by the additive fabrication device, the additive fabrication device performs method 300. An illustrative example of such a computing device is discussed below. While acts 306 and 308 relate specifically to film techniques, the other acts in FIG. 3 are not so limited; as such, an additive fabrication device that does not include a film may optionally perform any one or more of acts 302, 304 and 310.

According to some embodiments, method 300 may be performed in response to determining that a three-dimensional model of a part comprises at least one expanding area. For instance, a computing device may analyze the three-dimensional model and determine that the model comprises at least one expanding area (or at least that, once sliced by the computing device, the resulting layers will exhibit an expanding area). Additionally, or alternatively, method 300 may be performed in response to determining, based on a simulated intermediate form of the part, that the expected forces to be applied to the intermediate form of the part during fabrication would exceed a desired threshold. In either/both cases, the computing device may then generate instructions that, when executed by an additive fabrication device will fabricate the part while performing one or more of acts 302, 304, 306, 308, and 310 any number of times to mitigate the above-described issues that may arise when fabricating a part comprising an expanding area.

According to some embodiments, any one or more of acts 302, 304, 306, 308, and 310 may be performed in the following scenarios. First, an additive fabrication device may perform the process adjustments described for each of these acts for every layer of a part. In some cases, the acts may be adapted for each layer based on an extent to which the layer is part of an expanding area (e.g., based on a measure of expected peel force for that layer). Second, an additive fabrication device may perform the process adjustments described for each of these acts only for some layers. For example, the acts may be performed only for layers that are part of an expanding area (e.g., based on a measure of expected peel force for that layer). Third, an additive fabrication device may perform the process adjustments described for each of these acts for every layer of a part only when it is determined that the part includes at least one expanding area. The acts may be adapted for each layer based on an extent to which the layer is part of an expanding area (e.g., based on a measure of expected peel force for that layer).

In optional act 302, a layer may be cured in a plurality of stages, where the layer is separated from the container after each stage is cured. In this manner, a first portion of the layer may be cured, then the layer may be separated from the container. Then, instead of repositioning the part for the next layer as usual, the part is positioned for the same layer again, then a second portion of the layer is cured, then separated from the container, etc. This approach may reduce the peel forces by reducing the size of the area that is separated from the container. The different portions may be selected based on a regular pattern such as alternating stripes, quadrants, or using some other strategy.

In optional act 304, a layer may be cured using a coarse fill routine to cure the interior area of the layer. Typically in stereolithography the area of layer is fully cured, but in the example of FIG. 3 a layer may be partially cured with an infill pattern so that the perimeter is cured, but the interior is only partially cured (e.g., using a cross-hatch pattern). This approach may reduce the peel forces by reducing the size of the area that is separated from the container, and by allowing the peel to progress from a greater number of edges.

In optional act 306, a tension of a film in the additive fabrication device is adjusted subsequent to fabricating a layer expected to have an undesirably high peel force. More generally, the tension of the film may be adapted during fabrication based on an expected peel force for each layer. Increasing the tension of the film may stiffen the film and cause it to move less when the part is moved away from the film, whereas decreasing the tension of the film may allow the weight of the liquid in the container to facilitate a peel of the layer from the film. In some cases, decreasing the tension of the film may increase the angle between the part and the film, which may help in propagating a peel of the film away from the part. An additive fabrication device may include any suitable mechanism(s) for varying the tension of a film by operating one or more actuators to adapt the tension of the film based on an expected peel force for a given layer of the part.

Figure 4:
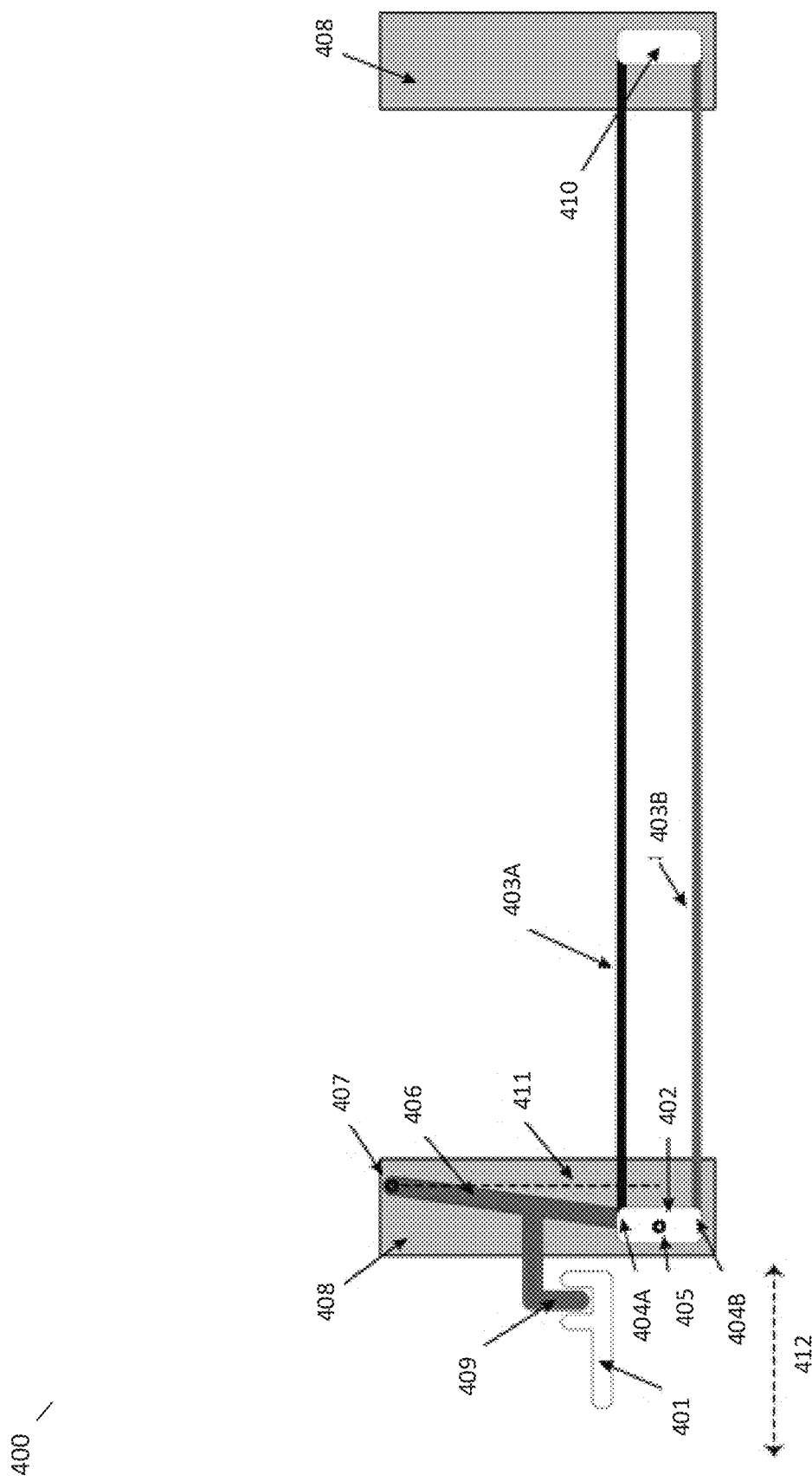
FIG. 4 depicts an illustrative device for adjusting the tension of a film in an additive fabrication device, according to some embodiments.

To describe one non-limiting example of a suitable device for adjusting the tension of a film in an additive fabrication device, an illustrative adjustable tensioning device is shown in FIG. 4 and described below. In the example of FIG. 4, dynamic tensioning system 400 includes a tank configured to be adjustably tensioned by means of a tensioning device 401, which is external to the tank and associated with a stereolithographic device in which the tank is installed. This configuration may allow the tank to be removable from the device, wherein the illustrated system 400 includes tensioning device 401 as part of the device with the remaining depicted components being elements of the tank. As shown in FIG. 4, the tank 400 may comprise a film 403A and film 403B, forming a film system 403. The films 403A and 403B may be mounted onto or around a distribution arm 402 at points 404A and 404B, respectively. In some embodiments, the distribution arm 402 may be a rotationally unconstrained shaft element.

Distribution arm 402 may be mounted via axis 405 onto a tensioning armature 406, which is configured to be rotatable about axis 407 within a tank side structure 408. Tensioning armature 406 comprises a coupling arm 409 which extends outward such that it may be at least partially captured by a tensioning device 401, associated with a stereolithographic device. The films 403A and 403B may be mounted on an opposing side tank structure 408 at a static mounting point 410. Alternatively, both sides of the tank structure 408 may include dynamic mounting elements. When not inserted into a stereolithographic device or otherwise engaged via the coupling arm 409, the tensioning armature 406 may adopt a relaxed position 411, resulting in a comparatively lower tension placed on films 403A and 403B. In some embodiments, the static mounting point 410 may be attached to a rotational axis in a similar manner to the coupling of elements 402 to axis 407. Incorporating this additional rotational axis coupled to the static mounting point may ensure the film maintains a desirable planar surface during tensioning, since the mounting points 402 and 410 may move to maintain the films in a substantially parallel arrangement.

When the tensioning mechanism 401 of the stereolithographic device is coupled to the coupling arm 409 of the removable tank, and displaced along axis 412, the tensioning armature 406 may be caused to rotate along axis 407, thus displacing the distribution arm 402 in the same direction along axis 412. As will be appreciated, such a motion of the distribution arm 402 away from the opposing mounting 410, or away from the opposing dynamic mounting elements in the case of two or more dynamic mounting elements, may result in an increase in tension along films 403A and 403B and, potentially, a degree of extension or other deformation of said films in response to the tension forces.

Since, in the example of FIG. 4, the distribution arm 402 may rotate about axis 405, the amount of tension applied to films 403A and 403B as a result of motion along axis 412 need not be constant. According to some embodiments, distribution arm 402 may form a whippletree (also known as a whiffletree) linkage, distributing forces applied via the axis 405 between the films 403A and 403B, attached at points 404A and 404B on the distribution arm 402. According to some embodiments, a whippletree or whiffletree linkage may refer to a rigid body able to apply two or more forces to two or more different points.

While the distances between the axis 405 and the attachment points 404A and 404B are shown to be symmetric in the example of FIG. 4, other embodiments may locate axis 405 such that a desired differential ratio of tension forces may, as a result of varying mechanical advantages on opposing sides of the whippletree linkage, be applied to films 403A and 403B for a given displacement along axis 412. Such a differential may be particularly advantageous where films 403A and 403B are formed of materials with dissimilar responses to tension forces, such as differing elastic constants.

In some embodiments, instead of independently attaching films 403A and 403B to the distribution arm 402, the films 403A and 403B may be bonded together at one end such that they are looped around the distribution arm 402 which may be a rotationally unconstrained shaft element. This configuration may, in at least some cases, allow the unconstrained shaft element to compensate for small differences in the slack of each film due to manufacturing tolerances, minor imperfections, and/or differing reactions to repeated mechanical forces such as different degrees of creep. In some embodiments, the films 403A and 403B may be joined or crimped together at one or more edges while allowing at least one free edge to provide oxygen permeability. The films may be adhered or attached at one end and at the crimp location by any number of methods including pins, adhesives, lamination, a crown piece, etc.

As shown in the example of FIG. 4, tension forces applied to the films 404A and 404B may be applied via displacement of the tensioning device 401 along axis 412. In some embodiments, the tank structure may be removable with the tensioning device 401 located outside of the replaceable structure. In some embodiments, tensioning device 401 may include any one or more conventional sources of tension forces, such as those produced by extension or torsion springs, potentially requiring user involvement to manually provide initial loading of the system. In some embodiments, tensioning device 401 may comprise a source of linear force, such as a hydraulic cylinder and/or other form of linear actuator. In some embodiments, rotational force may be converted into a linear displacement of the device 401 via means such as rack and pinion mechanisms, thus causing tension forces to be applied to the system.

In some embodiments, it may be advantageous for the tensioning device 401 to apply tension against the film only during the operation of the machine, such that tension is removed or otherwise reduced when the machine is not in use. Such detensioning may be helpful in preserving the working lifetime of the film and/or may allow for a removable film to be removed following a power loss or other failure of the device without requiring removal of the film while under tension.

In some embodiments, a stereolithographic device that includes dynamic tensioning system 400 may adjust the amount of displacement of the tensioning device 401 along the axis 412 during or between cycles of operation. In general, the amount of force applied to films 403A and 403B by a given amount of displacement along axis 412 may be dependent upon various physical properties of the film, including but not limited to a spring constant k. A comparatively inelastic material may have a high k value, such that a comparatively small amount of displacement (x) along the axis 412 results in a comparatively large amount of tensile force (F), as may be appreciated by an application of Hooke's Law ($F=kx$). As a result, the displacement applied may be selected based on a desired force according to Hooke's law.

In some embodiments, the application of tension to films 403A and 403B may cause a gradual deformation of the films, including stretching or elongating in response to the tension. Such distortions may cause a reduction in the amount of tension generated by additional displacement of the tensioning device 401 along the axis 412. In some embodiments, these effects may be managed via the application of a passive tensioner, such as a counter-spring. For instance, tensioning device 401 may be attached to an extension spring extending along axis 412, such that the "resting" state of the spring causes a force to be applied to the tensioning device 401 along axis 412 away from the tank structure 408. In some embodiments, however, it may be more advantageous to utilize more active tensioning means, such that additional control over the process may be provided. For example, it may be advantageous to vary the amount of tensile forces applied to the film based on the expected peel force for a given layer, which may be estimated based on the extent to which a layer is part of an expanding area.

Returning to FIG. 3, in optional act 308 a surface of the film may be wrinkled, puckered, or otherwise deformed. The illustrative system of FIG. 4 may be adapted to produce such an effect by introduce a non-uniform tension into the film.

In optional act 310, the way in which the build platform and container are moved relative to one another during a peel may be adapted. For instance, a stereolithography device comprising a film may use the following motion profile. The build platform may move with an initial fast movement to preload a force on the film, then may slowly lift as the peel progresses. This profile may be adapted for layers that are part of an expanding area by moving up then down instead, or by moving the build platform laterally rather than vertically (or in addition to vertically). These movements may be superfluous for many layers, so in some embodiments may be performed only for layers that are part of an expanding area to encourage the peeling of the film from the layer while minimizing time added to the fabrication process.

Figure 5B:
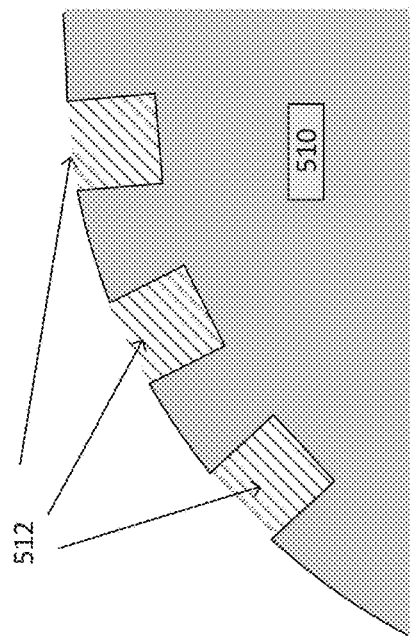
FIGS. 5A-5D illustrate a technique for modifying a model of a part by introducing notches, according to some embodiments.
Figure 5D:
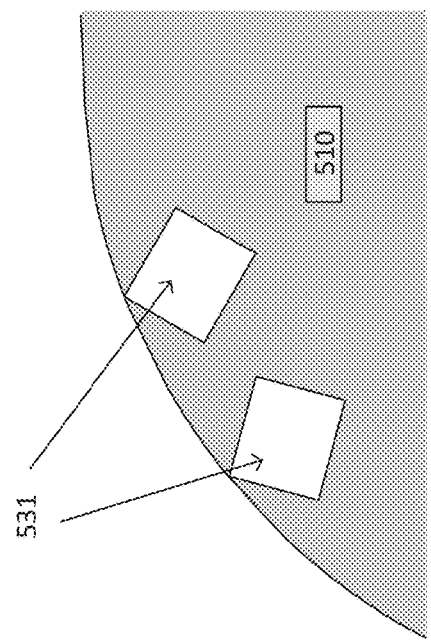
Figure 5A:
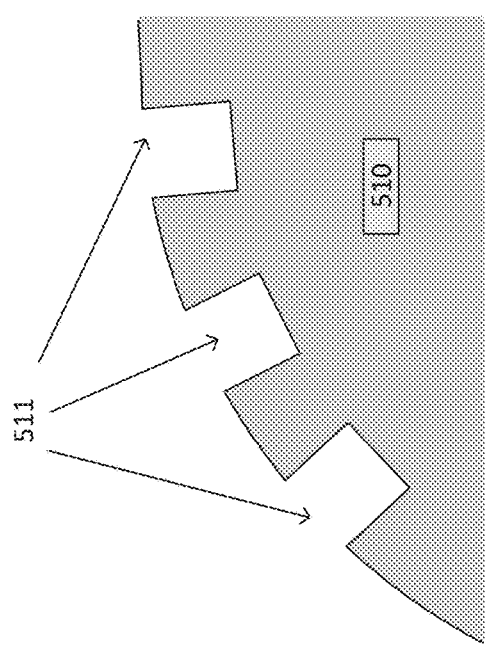

FIGS. 5A-5D illustrate a technique for modifying a model of a part by introducing notches, according to some embodiments. In the examples of FIGS. 5A-5D, a part 510 is modified to include a plurality of notches, which are gaps close to or around the perimeter of the part that decrease the peel force of the layer. In the example of FIG. 5A, notches 511 are generated; in the example of FIG. 5B, notches 512; in the example of FIG. 5C, notches 521 and 522; and in the example of FIG. 5D, notches 531. Without wishing to be bound by theory, it is believed that forming notches within a layer may make it easier for the liquid photopolymer to begin to flow between the layer and the container, thereby facilitating a peel. Additionally, or alternatively, a notch may present a defect in a suction-cup like structure represented by a formed layer of material, thereby allowing the film to pull on a more rigid section of the part rather than an edge that is more flexible and compliant.

Figure 5C:
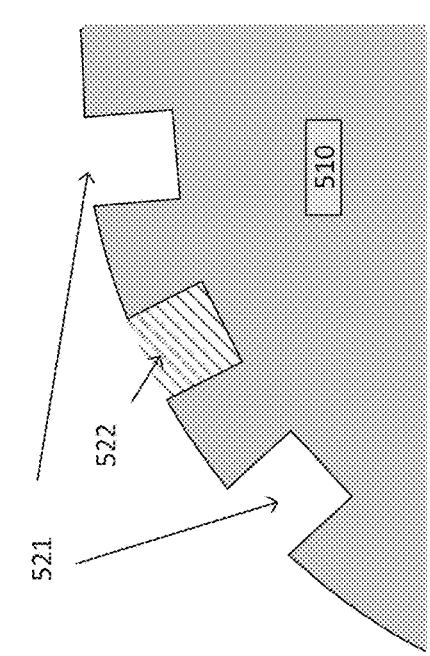

According to some embodiments, the notches may be regions that are not cured at all, as in the example of notches 511 and 521 shown in FIGS. 5A and 5C, respectively, or may be regions that are partially cured, as in the example of notches 512 and 522 shown in FIGS. 5B and 5C, respectively, with the shaded regions in FIGS. 5B and 5C being partially cured regions. Regions that are 'partially cured' may refer to regions that are cured at lower power, such that the device is configured to cure photopolymer in those regions to some extent but to a lower degree than the other regions in the layers. Regions that are 'partially cured' may alternatively or additionally refer to regions that are cured with a different cure depth than other regions of the layer. That is, photopolymer may be fully cured within the partially cured regions, but with a different resulting thickness of solid material than in the other regions of the layer.

According to some embodiments, the notches may be regions that slope inwards (towards the inside of the part), or outwards (towards the perimeter of the part) and may be formed over a single layer, or over a number of layers. The notches may have a size (e.g., diameter, length around the perimeter, etc.) of less than 1 mm, and may have any suitable cross-sectional shape, as their shape is not limited to the example shape shown in FIGS. 5A-5C. For instance, the notches may have a spherical shape with a diameter of approximately 0.5 mm. In another example, the notches may have a rectangular cross-sectional shape, trapezoidal cross-sectional shape, or other polygonal cross-sectional shapes.

According to some embodiments, the depth of a notch into the layer, the width of the lowest exposure section, and/or the blend-width of the exposure gradient from skin to lowest power notch exposure are all parameters that may be adjustable.

According to some embodiments, notches may be arranged around some, but not all, of the perimeter of a layer within an expanding area. In particular, the notches may be arranged along portions of the perimeter that are oriented along a film suspension direction in an additive fabrication device that includes a film. For instance, in the example of the device shown in FIGS. 1A-1D, in which the film is extended over an opening and attached at left and right sides of the film, when forming a part the notches may be generated along the sides of the part that are at the front and/or back of the device. In some embodiments, when a moving stage is coupled to the suspended film (e.g., the optics module 109 underneath the film 103), to reduce undesired artifacts on the surface finish, notches are applied to the front, back, and trailing side (e.g., with respect to the motion of the moving stage) of the part, but not on the leading side. As such, the notches may be generated by a computing device based not only on the geometry of a three-dimensional model of the part, but also based on how the part is going to be oriented during fabrication. In general, however, the notches may be arranged at appropriate locations around some, but not all, of the perimeter of a layer with the locations selected based on the directionality of forces applied in a given device.

According to some embodiments, notches as shown in FIG. 5B may be generated by adjusting the exposure of actinic radiation applied to those regions of a layer, rather than modifying the model from which the exposure instructions are generated. As such, generating notches may be viewed as another optional act within the context of method 300 in FIG. 3. For instance, the notches may be produced by exposing the notch regions to approximately 50% or less of the power of the adjacent solid perimeter of the layer. In some embodiments, for notch regions that also receive higher overhang exposure, the reduction of exposure in those regions is greater than 50%. In some embodiments, such notches may subsequently be back-filled by overexposing (e.g., with greater power, greater cure depth, etc.) the underlying regions of the next layer, to complete curing of the notch regions. Alternatively, notches may be produced by varying the position of notches from layer to layer, which may cause notches to be filled in subsequent layers since the typical cure depth of the actinic radiation may be deeper than the thickness of a single layer. In either case, the notches may reduce the peel force of a layer without producing visible surface artifacts in the fabricated part.

According to some embodiments, notches as shown in FIG. 5C may include a mixture of notches that are openings and that are partially cured. That is, a mixture of the types of notches shown in FIGS. 5A and 5B, as shown in the example of FIG. 5C.

In some embodiments, notches may be produced proximal to the perimeter of a layer but inset from the perimeter so that they are not open to the surface of the part. Such notches may be referred to as interior notches or hidden notches. FIG. 5D depicts an example of such hidden notches wherein notches 531 are formed close to the perimeter of the layer 510 but do without altering the intended surface shape of the perimeter. Thus, in contrast to the notches of FIGS. 5A-5C, which cause the shape of the perimeter of the layer 510 to be altered to accommodate the notches, the notches 531 should not negatively impact the surface of the part (it may be noted that the surface may not be negatively impacted by the notches of FIGS. 5A-5C in at least some cases, but this is due to either the size of the notches and/or curing of the notches in a subsequent layer, rather than the notch itself being arranged so as not to affect the surface). In some cases, hidden notches may be cured in a subsequent layer so that an uncured pocket of liquid photopolymer is not left within the part.

According to some embodiments, notch regions may be cured within a first layer by first curing a first portion of the layer that does not contain notches, then separating the first portion of the layer from the container. Then, instead of repositioning the part for the next layer as usual, the part is positioned for the first layer again, then a second portion of the layer that contains the notches is cured. As a result, the notches may allow for reduced peel forces, but may be filled in within the same layer in which they were formed rather than being back filled via the techniques described above.

Figure 6:
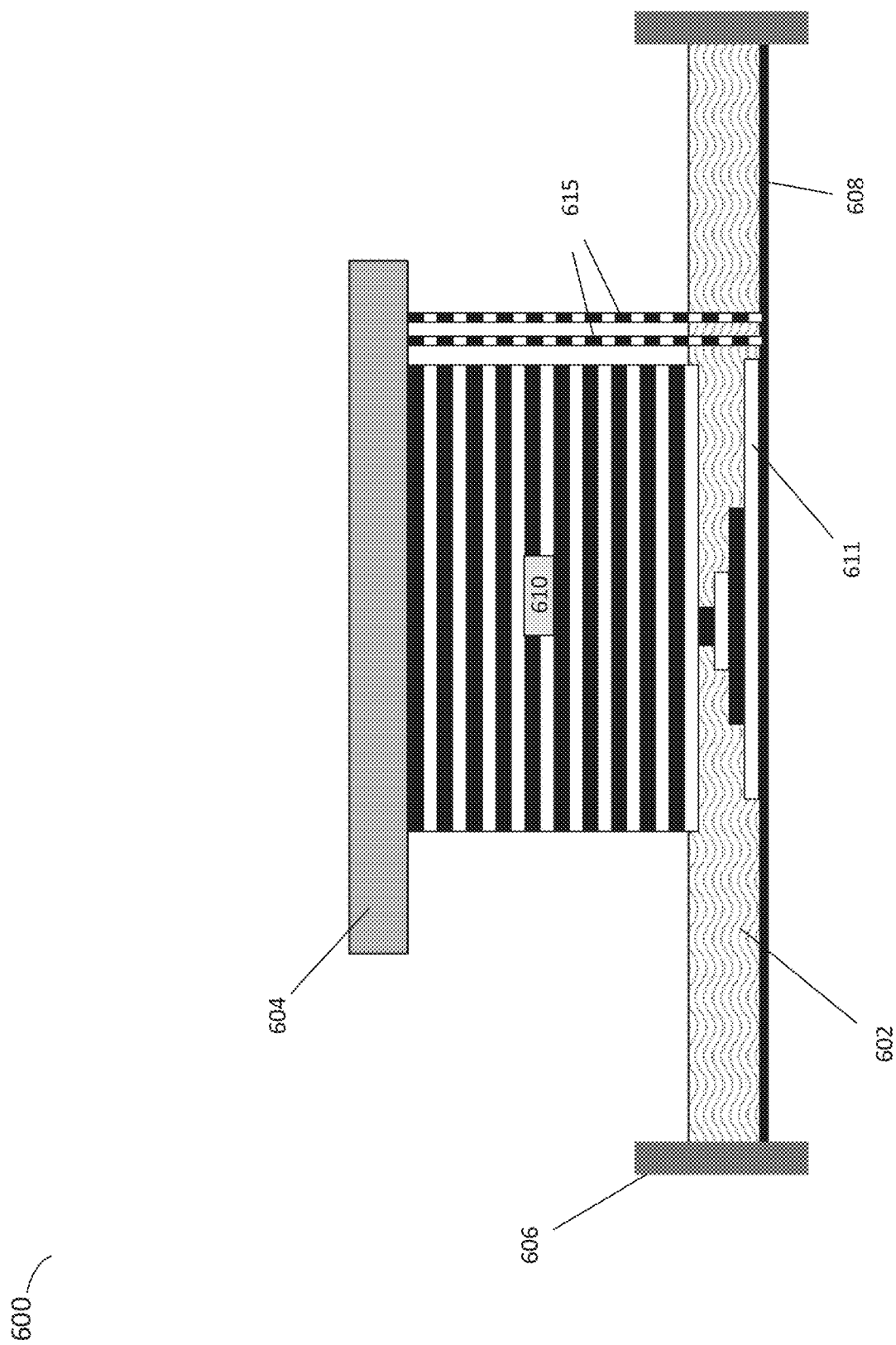
FIG. 6 illustrates a schematic view of a stereolithographic device in which a support structure is fabricated adjacent to an expanding area, according to some embodiments.

FIG. 6 illustrates a schematic view of a stereolithographic device in which a support structure is fabricated adjacent to an expanding area, according to some embodiments. In the example of FIG. 6, stereolithographic device 600 includes a build platform 604, and a container 606 that includes a film 608 and holds a liquid photopolymer 602. As shown in FIG. 6, a part 610 is in the process of being formed on the build platform 604, and includes a number of layers including the most recently formed layer 611, which has been formed in contact with the film 608 of the container.

In the example of FIG. 6, the model of the part 610 has been modified by adding an additional structure 615. This structure may be similar to a conventional support structure but may be configured not to contact the part at any point, but rather be formed on the build platform and extend away from the build platform. When a peel is performed in the example of FIG. 6, if the peel is started at the right side of the part, rather than the edge of layer 611 being the location where the peel is initiated, the bottom of the structure 615 may instead initiate the peel. This may have a benefit of starting the peel in a small area—the tip of the structure 615 has a much smaller surface area than layer 611—as well as starting the peel adjacent to the layer 611. As a result, the activation energy needed to get the peel started is lowered and once begun the peel is more likely to propagate as the weight of the liquid pushes to flow into the peeled area. As such, the peel force required to peel layer 611 from the film may be reduced.

Figure 7:
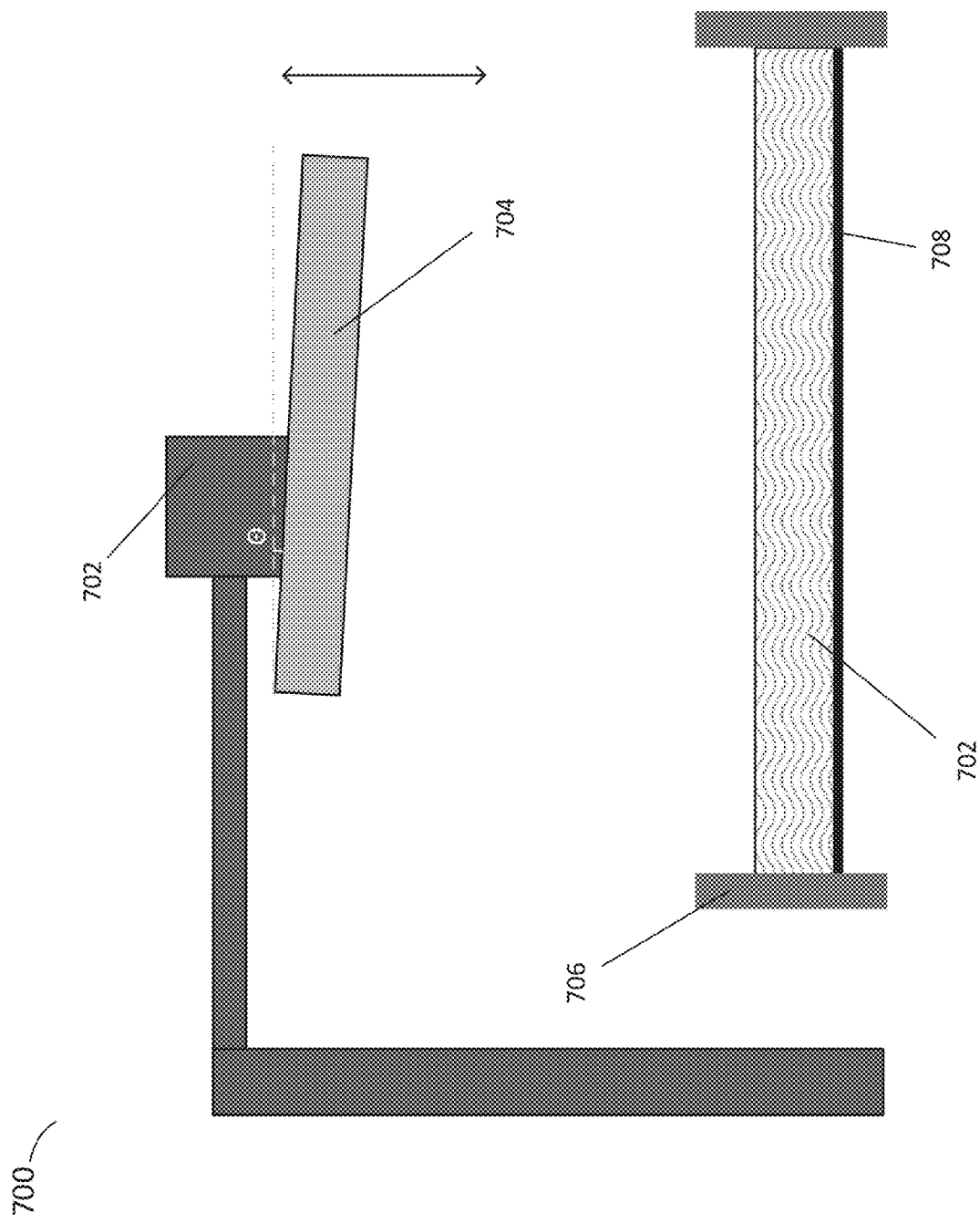
FIG. 7 illustrates a schematic view of a stereolithographic device in which a build platform is hinged downward, according to some embodiments.

FIG. 7 illustrates a schematic view of a stereolithographic device in which a build platform is mounted with a downward bias, according to some embodiments. In the example of FIG. 7, stereolithographic device 700 includes a build platform 704, and a container 706 that holds a liquid photopolymer 702. The build platform 704 is mounted to a Z-stage 702, which is configured to raise and lower the build platform into and out of the container 706. In contrast to a conventional build platform Z-stage configuration, however, in the example of FIG. 7 the build platform is tilted toward the front of the container, or may be operable to tilt in that direction.

When a conventional build platform Z-stage is lowered into a container and pulls up on a newly-formed layer of material, the build platform can act like a cantilever because it is generally mounted to the Z-stage at the back of the device (on the left of FIG. 7). As a result, pulling up on the layer of material does not necessarily result in an evenly-applied force because the front of the build platform may be 'springier' or otherwise more mobile than the back. While mounting arrangements that are different from that of FIG. 7 may be envisioned, any approach in which a build platform is not mounted directly in its center will exhibit a greater degree of mobility along one axis more than another.

In the example of FIG. 7, the build platform 704 is tilted away from the mounted end of the build platform (away from the left side in the figure). According to some embodiments, the build platform may be fixed in this orientation. According to some embodiments, the build platform may be controllable (e.g., via one or more actuators coupled to the build platform) to be rotated from a horizontal orientation to the depicted rotated position and back as desired.

According to some embodiments, the build platform may be fixed at an angle or may be operable to rotate to an angle, of greater than or equal to 0.01°, 0.02°, 0.05°, 0.08°, 0.10°, 0.15°, 0.20°, or 0.25°. According to some embodiments, the build platform may be fixed at an angle or may be operable to rotate to an angle, of less than or equal to 0.25°, 0.20°, 0.15°, 0.10°, 0.08°, 0.05°, 0.05°, or 0.01°. Any suitable combinations of the above-referenced ranges are also possible (e.g., an angle of greater than or equal to 0.02° and less than or equal to 0.10°). The above-references angles refer to an angle $\Theta$ shown in FIG. 7 between a horizontal plane (e.g., perpendicular to the Z-stage axis of motion, perpendicular to the surface of the container, etc.) and the surface of the build platform.

Figure 8:
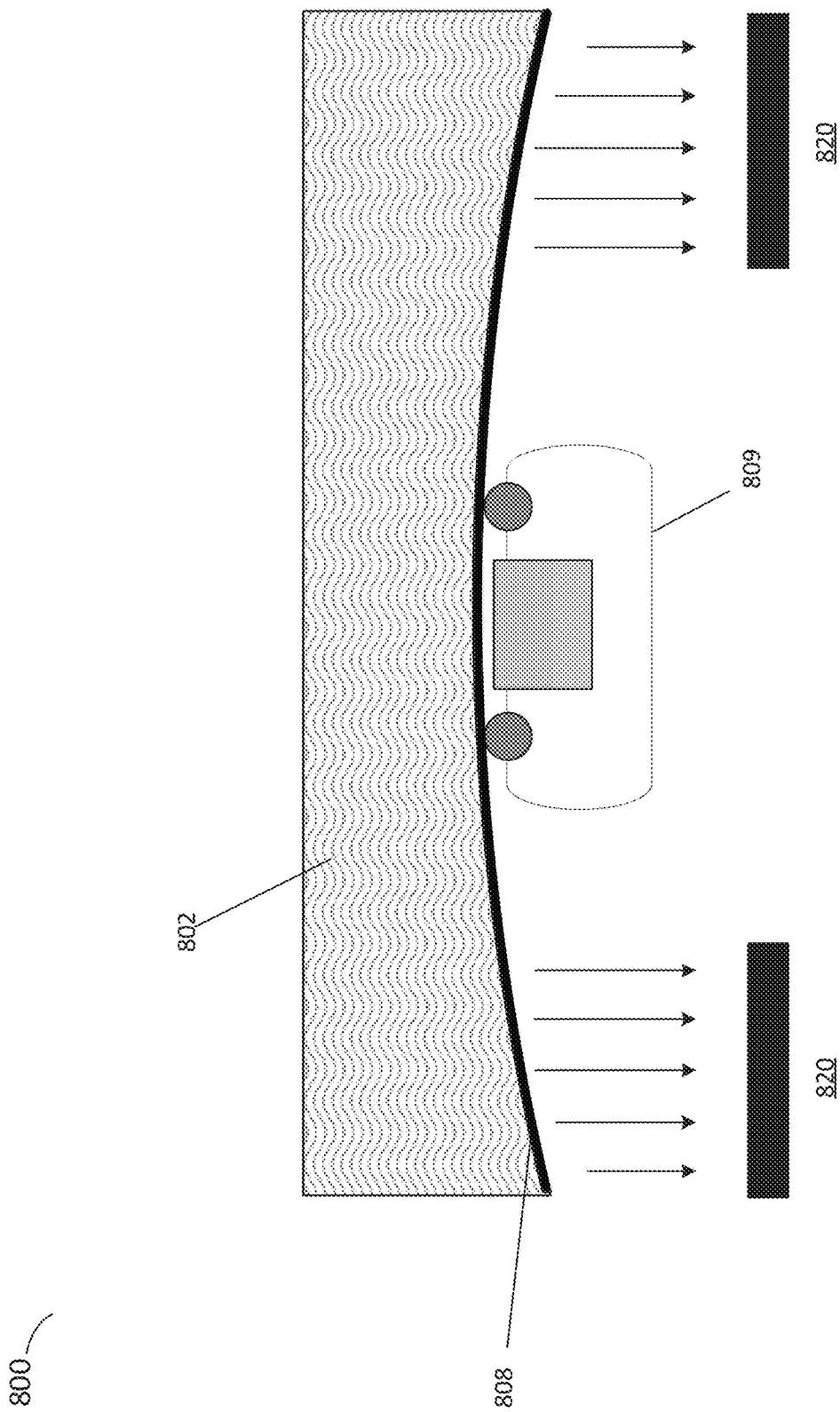
FIG. 8 illustrates a schematic view of a stereolithographic device in which a film is deflected using magnets, according to some embodiments.

FIG. 8 illustrates a schematic view of a stereolithographic device in which a film is deflected using magnets, according to some embodiments. The example of FIG. 8 depicts a portion of a stereolithographic device 800 wherein a container comprises a film 808 and holds a liquid photopolymer 802, and is supported by an optics module 809. The device also includes magnets 820.

In the example of FIG. 8, the film 808 comprises a layer of a ferromagnetic metal, is impregnated with a ferromagnetic metal (e.g., comprises ferromagnetic metal particles), and/or is or otherwise ferromagnetic. Due to the ferromagnetic property of the film 808, the magnets 820 may apply a force to the film and deflect the film downwards on either side of the optics module 809, thereby reducing the peel force necessary to separate a layer of material from the film.

According to some embodiments, the magnets 820 may be permanent magnets and may be coupled to one or more actuators configured to move the magnets towards and away from the film. Therefore, by moving the magnets, the desired deflection of the film may be produced, and the film returned to a flat (or approximately flat) state.

According to some embodiments, the magnets 820 may be electromagnets configured to be operated to produce the desired deflection of the film. Therefore, by activating the magnets, the deflection may be produced, and by deactivating the magnets, the film may be returned to a flat (or approximately flat) state.

In some embodiments, the magnets may be part of the optics module 809 so that they move underneath the film with the optics module and deform the film (or can be operated to deform the film) around opposing sides of the optics module.

Figure 9:
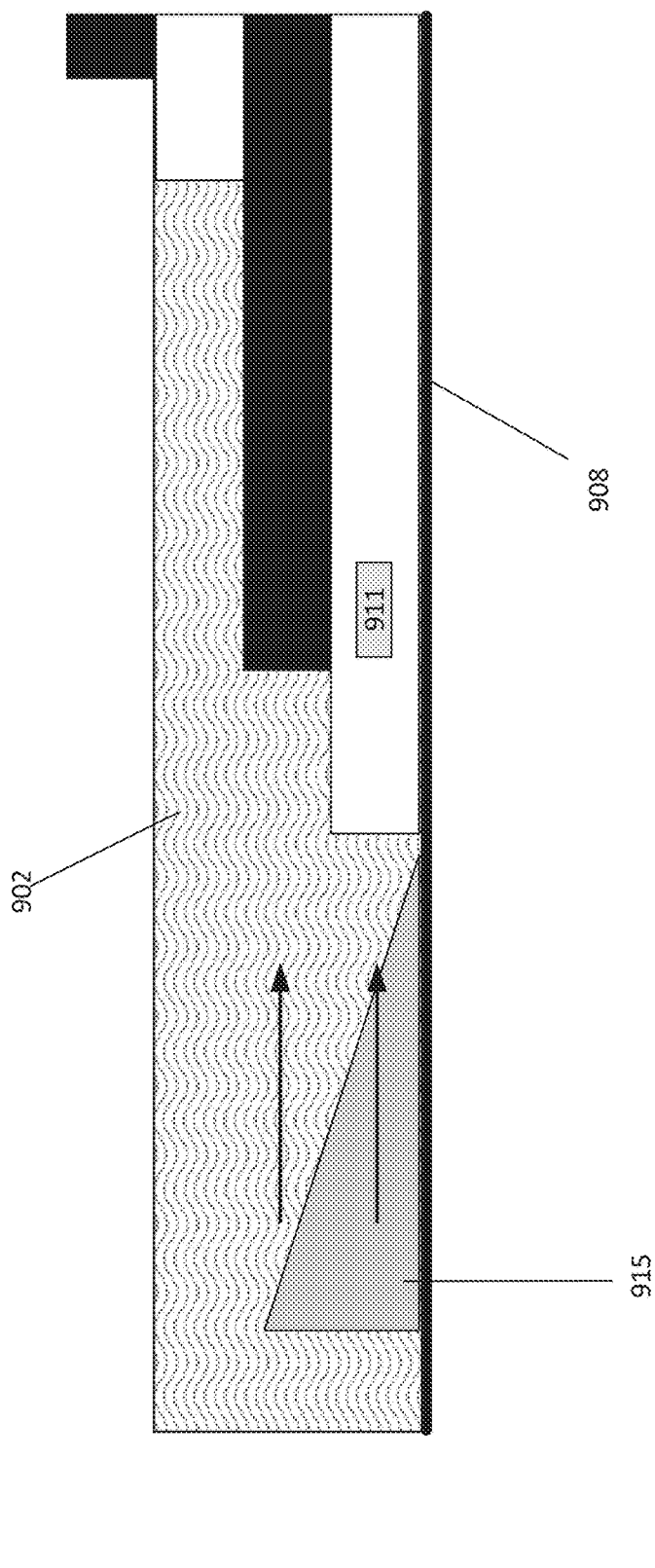
FIG. 9 illustrates a schematic view of a stereolithographic device in which a wedge element is inserted beneath a layer in an expanding area, according to some embodiments.

FIG. 9 illustrates a schematic view of a stereolithographic device in which a wedge element is inserted beneath a layer in an expanding area, according to some embodiments. The example of FIG. 9 depicts a portion of a stereolithographic device 900 wherein a container comprises a film 908 and holds a liquid photopolymer 902. A part 911 is being formed on the film. The stereolithographic device 900 also includes a wedge-shaped structure 915 configured to move horizontally over the surface of the film and between the film and the part 911 to initiate a peel of the part from the film.

In some embodiments, the wedge-shaped structure 911 may be part of a wiper or mixer within the stereolithographic device 900 and may be operated in some cases to separate the layer from the film while also performing other functions such as mixing or redistributing the photopolymer. An example of a suitable mixer is described in U.S. application Ser. No. 16/817,522, titled "Techniques for Mixing in Additive Fabrication and Related Systems and Methods," filed on Mar. 12, 2020, which is hereby incorporated by reference in its entirety.

Another approach to reduce the peel force, not shown in FIG. 9, is to produce a pressure differential on opposing sides of the film in the container so that the film is inhibited from moving. For instance, the ambient pressure beneath the film may be reduced (e.g., by blowing air out from that region or by use of a vacuum pump) to inhibit the film from being pulled upward. As a result, the film may be effectively stiffer and resist the upward pull from the part when it is moved.

Figure 10:
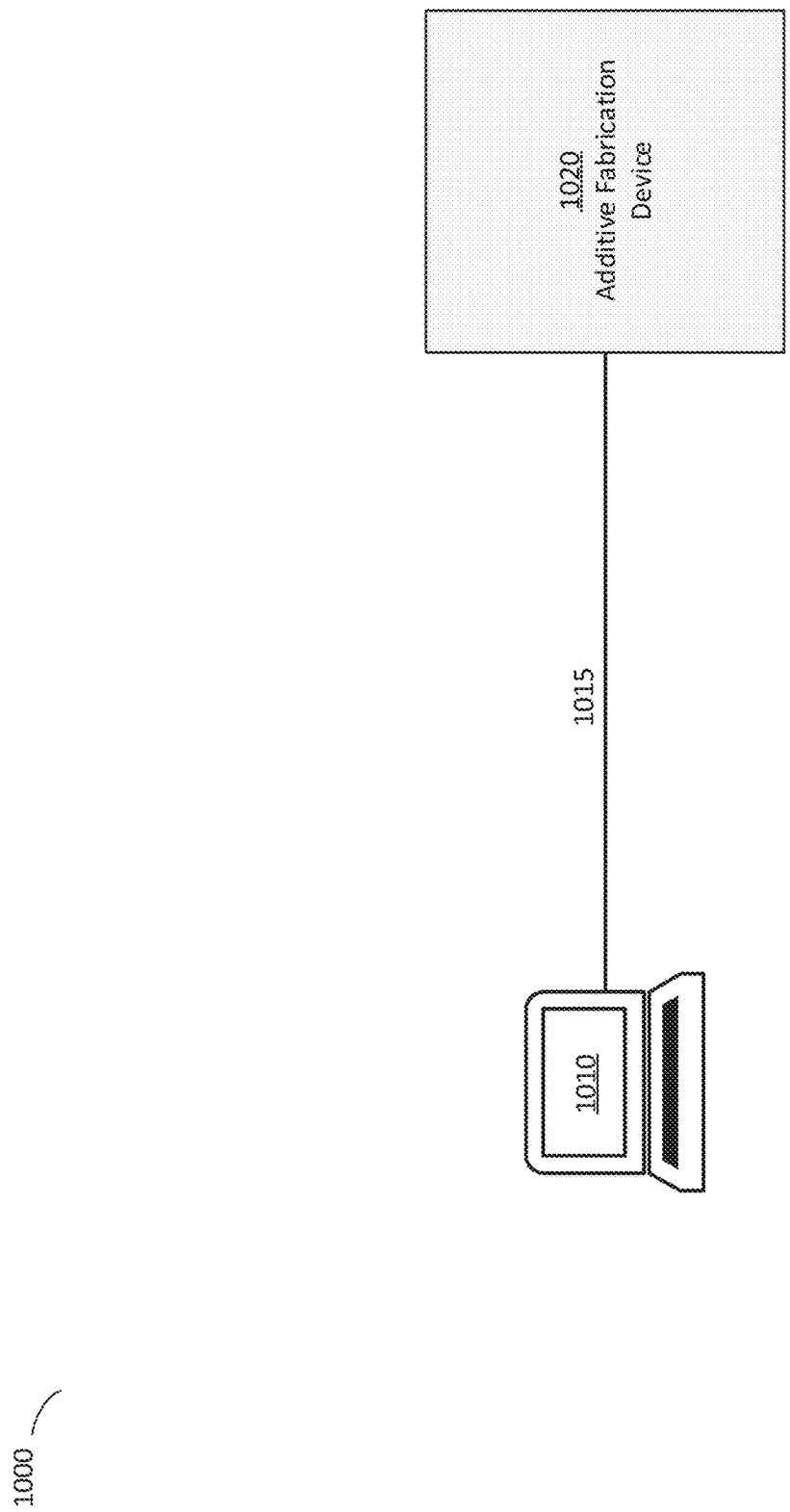
FIG. 10 is a block diagram of a system suitable for practicing aspects of the invention, according to some embodiments.

FIG. 10 is a block diagram of a system suitable for practicing aspects of the invention, according to some embodiments. System 1000 illustrates a system suitable for generating instructions to perform additive fabrication by an additive fabrication device and subsequent operation of the additive fabrication device to fabricate a part. For instance, instructions to fabricate a part while performing any one or more of the acts of method 300 shown in FIG. 3 may be generated by the system and provided to the additive fabrication device. Various parameters associated with the process improvements of acts 304, 306, 308, 310 and 312 may be stored by system computer system 1010 and accessed when generating instructions for the additive fabrication device 1020.

It will be appreciated that any of the above-described techniques for reducing peel forces may be combined in any suitable manner and in any suitable order. According to some embodiments, computer system 1010 may execute software that generates instructions for fabricating a part using an additive fabrication device, such as method 300 shown in FIG. 3. Said instructions may then be provided to an additive fabrication device, such as additive fabrication device 1020, via link 1015, which may comprise any suitable wired and/or wireless communications connection. In some embodiments, a single housing holds the computing device 1010 and additive fabrication device 1020 such that the link 1015 is an internal link connecting two modules within the housing of system 1000.

Figure 11:
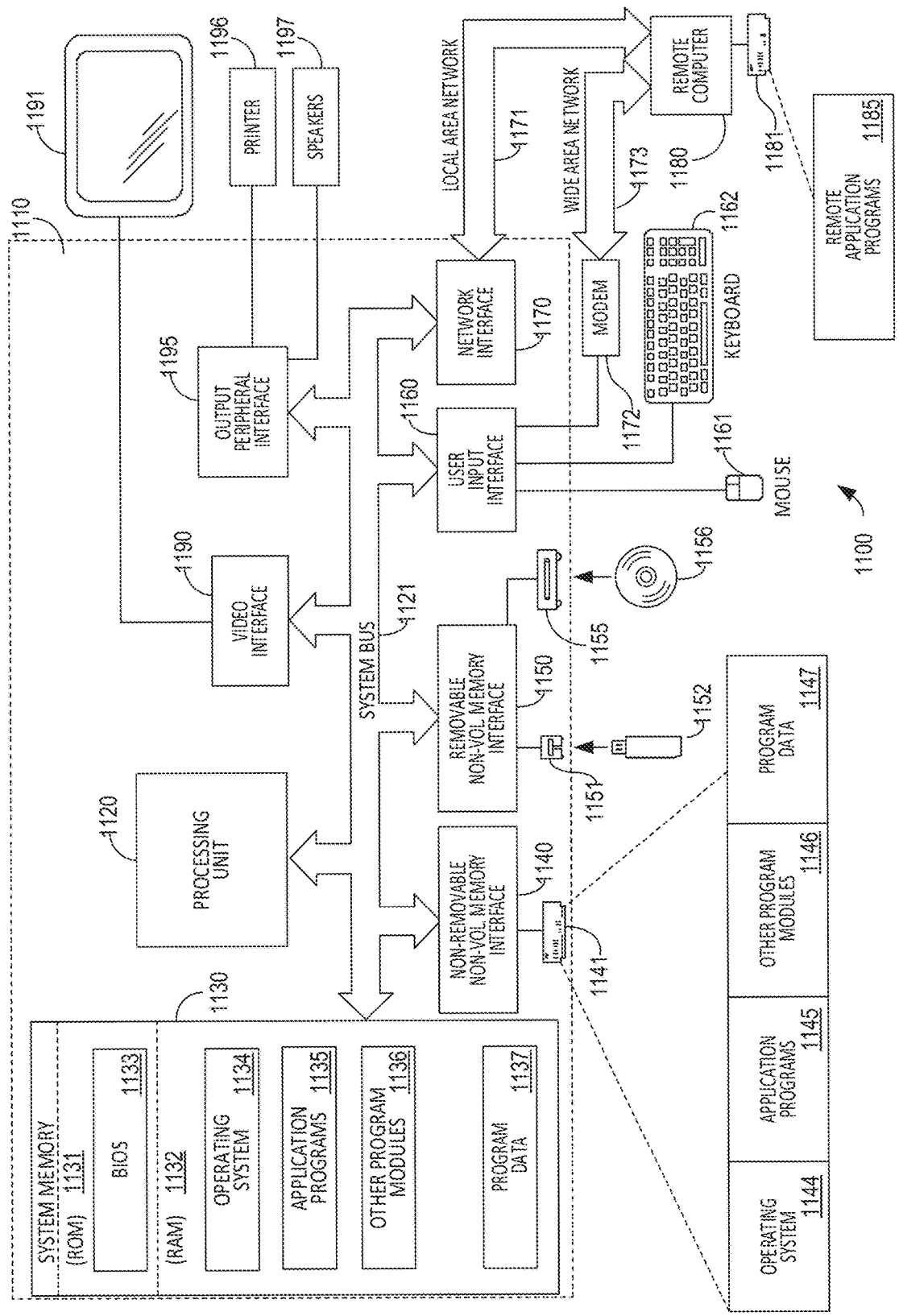
FIG. 11 illustrates an example of a computing system environment on which aspects of the invention may be implemented.

FIG. 11 illustrates an example of a suitable computing system environment 1100 on which the technology described herein may be implemented. For example, computing environment 1100 may form some or all of the computer system 1010 shown in FIG. 10. The computing system environment 1100 is only one example of a suitable computing environment and is not intended to suggest any limitation as to the scope of use or functionality of the technology described herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology described herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133

(BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a flash drive 1151 that reads from or writes to a removable, nonvolatile memory 1152 such as flash memory, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of configuring an additive fabrication device to fabricate an object, the additive fabrication device configured to form the object from a plurality of layers of solid material by directing at least one source of actinic radiation onto a liquid photopolymer, the method comprising:
generating, using at least one processor, instructions that, when executed by the additive fabrication device, cause the additive fabrication device to fabricate the object at least in part by:
forming a first layer of the object according to a three-dimensional model of the object, wherein a first region of the first layer is cured by the at least one source of actinic radiation at a first exposure power, and wherein a second region of the first layer is cured by the at least one source of actinic radiation at a second exposure power, wherein the first region of the first layer comprises a plurality of notches around at least a portion of a perimeter of the first layer; and
forming a second layer of the object in contact with the first layer of the object, wherein at least a third region of the second layer overlaps a portion of the first region of the first layer, and wherein the third region of the second layer is cured with a greater cure depth than an adjacent region of the second layer, thereby directing additional actinic radiation to the portion of the first region of the first layer through the third region of the second layer.

2. The method of claim 1, wherein the first exposure power is lower than the second exposure power.

3. The method of claim 1, wherein a combination of the first region of the first layer and the third region of the second layer slopes towards the center of the first layer.

4. The method of claim 1, wherein the third region of the second layer has the same cross-sectional shape as the first region of the first layer.

5. The method of claim 1, wherein the additive fabrication device comprises a film suspended across an opening oriented in a first direction, and wherein the at least a portion of the perimeter of the first layer is oriented in the first direction.

6. The method of claim 1, further comprising generating the plurality of notches based on an orientation and/or a geometry of the three-dimensional model of the part.

7. The method of claim 1, wherein curing the first region of the first layer at the first power is performed in response to determining that the three-dimensional model of the part comprises at least one expanding area.

8. The method of claim 1, wherein forming the first layer of the object comprises:
curing the first region of the first layer in contact with a container;
separating the first region of the first layer from the container; and
curing the second region of the first layer in contact with the container.

9. A computer system comprising:
at least one processor;
at least one non-transitory computer readable medium comprising processor-executable instructions that, when executed, cause the at least one processor to perform a method of configuring an additive fabrication device to form an object from a plurality of layers of solid material by directing at least one source of actinic radiation onto a liquid photopolymer, the method comprising:
generating, using at least one processor, instructions that, when executed by the additive fabrication device, cause the additive fabrication device to fabricate the object at least in part by:
forming a first layer of the object according to a three-dimensional model of the object, wherein a first region of the first layer is cured by the at least one source of actinic radiation at a first exposure power, and wherein a second region of the first layer is cured by the at least one source of actinic radiation at a second exposure power, wherein the first region of the first layer comprises a plurality of notches around at least a portion of a perimeter of the first layer; and
forming a second layer of the object in contact with the first layer of the object, wherein at least a third region of the second layer overlaps a portion of the first region of the first layer, and wherein the third region of the second layer is cured with a greater cure depth than an adjacent region of the second layer, thereby directing additional actinic radiation to the portion of the first region of the first layer through the third region of the second layer.

10. The computer system of claim 9, wherein the first exposure power is lower than the second exposure power.

11. The computer system of claim 9, wherein a combination of the first region of the first layer and the third region of the second layer slopes towards the center of the first layer.

12. The computer system of claim 9, wherein the third region of the second layer has the same cross-sectional shape as the first region of the first layer.

13. The computer system of claim 9, wherein the additive fabrication device comprises a film suspended across an opening oriented in a first direction, and wherein the at least a portion of the perimeter of the first layer is oriented in the first direction.

14. The computer system of claim 9, further comprising generating the plurality of notches based on an orientation and/or a geometry of the three-dimensional model of the part.

15. The computer system of claim 9, wherein curing the first region of the first layer at the first power is performed in response to determining that the three-dimensional model of the part comprises at least one expanding area.

16. The computer system of claim 9, wherein forming the first layer of the object comprises:
curing the first region of the first layer in contact with a container;
separating the first region of the first layer from the container; and
curing the second region of the first layer in contact with the container.

* * * * *